United States Patent [19]
McKinley

[11] Patent Number: 6,111,924
[45] Date of Patent: Aug. 29, 2000

[54] ERROR-CORRECTION-CODE SYNCHRONIZATION IN A VIDEOCONFERENCING GATEWAY

[75] Inventor: Brittain S. McKinley, Melrose, Mass.

[73] Assignee: VideoServer, Inc., Burlington, Mass.

[21] Appl. No.: 09/018,246

[22] Filed: Feb. 3, 1998

[51] Int. Cl.$^7$ ....................................................... H04L 7/00
[52] U.S. Cl. .......................... 375/354; 375/365; 375/366; 375/368; 370/503; 370/509; 370/512; 370/513; 370/514; 714/758; 714/775; 714/789; 714/798
[58] Field of Search ....................................... 375/365, 366, 375/368, 354; 370/503, 509, 512, 513, 514; 714/54, 12, 707, 758, 775, 789, 798

[56] References Cited

U.S. PATENT DOCUMENTS

| | | | |
|---|---|---|---|
| 5,502,748 | 3/1996 | Wilkinson | 375/354 |
| 5,570,370 | 10/1996 | Lin | 370/95.3 |
| 5,600,646 | 2/1997 | Polomski | 370/263 |
| 5,903,619 | 5/1999 | Claisemartin | 375/366 |
| 5,956,377 | 9/1999 | Lang | 375/372 |

OTHER PUBLICATIONS

International Telecomunication Union, "Video Codec for Audiovisual Services at p×64 kbit/s," ITU–T Recommendation H.261 (Mar. 1993).

Primary Examiner—Stephen Chin
Assistant Examiner—Dac V. Ha
Attorney, Agent, or Firm—Cesari and McKenna, LLP

[57] ABSTRACT

A de-framer (72) in a communications gateway (22) translates videoconferencing information from a circuit-switched format to a packet-switched format. A demultiplexor (78) extracts a bitstream containing video information that includes error-correction-code fields disposed at predetermined locations with respect to synchronization bits spaced by a synchronization interval and forming a predetermined synchronization sequence. A frame checker (88) for checking the error-correction code finds codeword boundaries by comparing the predetermined synchronization sequence with sequences of synchronization-interval-spaced video-bitstream bits until it finds a match. To do so, the frame checker (88) takes a group of video-bitstream words offset from each other by the synchronization interval. It compares each word in the group with a respective synchronization word consisting of a word-width replication of a respective synchronization bit. Enough words resulting from the comparisons are ORed together that the result will be all ones unless each video-bitstream word contains a respective synchronization bit in a corresponding bit position. If the result does contain a zero, then it can be inferred that the video bitstream contains synchronization bits in corresponding bit positions.

3 Claims, 15 Drawing Sheets

ERROR-CORRECTION-CODE SYNCHRONIZATION IN A VIDEOCONFERENCING GATEWAY

BACKGROUND OF THE INVENTION

The present invention is directed to video communications and in particular to achieving synchronization in error-correction-coded video bitstreams.

Digital video communications transmit large amounts of information, which can be vulnerable to corruption in the communication process. To reduce this vulnerability, it is commonplace to add redundancy to the data. The result is a sequence of code words, each of which consists of a predetermined number of bits of the original, non-redundant video data concatenated with error-correction-code (ECC) bits generated from those data to bear a predetermined relationship to the data bits. If they do not, the receiving node can conclude that an error has occurred. In many cases, the code is so constructed that the receiving node can not only detect errors but also correct them in most cases.

In order to take advantage of these features, the receiving node has to determine where one code word ends and the next one starts. A mechanism for achieving this "synchronization" is for each code word to be preceded by a single synchronization bit so chosen that the synchronization bits preceding successive code words form a predetermined synchronization sequence.

Suppose, for instance, that the length of a code word is 511 bits and each code word is preceded by a synchronization bit so that every 512th bit is a synchronization bit. If the synchronization sequence is relatively long, then if every 512th bit after a given candidate bit forms with it the predetermined synchronization sequence, the receiving node can conclude with a relatively high degree of confidence that the candidate bit is indeed a synchronization bit. For instance, if the synchronization sequence is thirty-two bits long, there is less than one chance in four billion that a bit other than a synchronization bit will form with every five hundred twelfth bit thereafter the predetermined thirty-two-bit synchronization sequence. So the synchronization-bit approach to finding code-word boundaries can be quite reliable.

Unfortunately, it can also be quite time-consuming. Basically, candidate bits must be fetched from, say, thirty-two widely spaced positions in the received data record. The resultant sequence must then be compared with the expected synchronization sequence, and the process must be repeated until a match is found.

SUMMARY OF THE INVENTION

We have developed a way of greatly expediting this process. Our approach reorders the operations in such a manner as to take advantage of a microprocessor's datapath width. Specifically, rather than initially form a synchronization-sequence-length (in the example, thirty-two-bit-long) bit sequence by fetching bits from locations separated by the code-frame frame length (512 bits in the example), we simply start with a word-length sequence of consecutive bits from the incoming video bitstream and compare them with a word-length replication of one of the synchronization-sequence bit values. The result of the comparison is saved as the initial value of a sum word, and the operation is repeated with a sequence extracted from the bitstream at a location displaced from the first sequence's location by the code-frame length. The result of that comparison is ORed with the sum word to produce a new sum word, and this operation is repeated a number of times equal to the length of the synchronization sequence.

If the word-length video-bitstream sequence, with which the operation started contains a synchronization bit, then the sum word will still have a zero in the corresponding bit at the end of many OR operations. Otherwise, all bits will be ones, and the operation is repeated, beginning with a new word-width sequence. Operation proceeds in this manner until synchronization is achieved, as indicated by a zero in the sum word.

Employing this approach enables the system to expedite the synchronization process by taking advantage of the microprocessor's word width.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
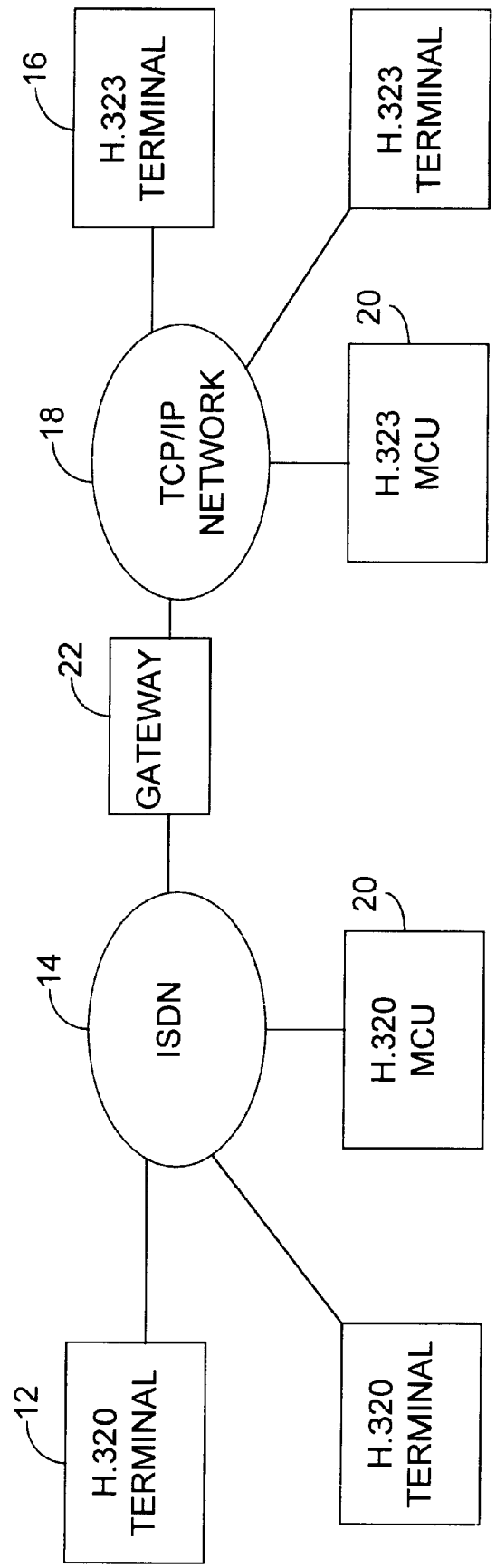
FIG. 1 is a block diagram of a communications topology of the type in which the videoconferencing gateway of the present invention will typically be employed.

Terminals 12 in FIG. 1 that employ the public switched telephone network for videoconferencing, for instance by using the Integrated Services Data Network (ISDN) 14, typically comply with Recommendation H.320 of the International Telecommunications Union's Telecommunication Standardization Sector (ITU-T). Terminals 16 that employ packet-switched networks such as the Internet 18 instead comply with that organization's Recommendation H.323. To represent the videoconferencing nature of the arrangement, FIG. 1 includes multipoint control units (MCUs) 20, which both standards require to provide certain organizational capabilities.

To enhance videoconferencing flexibility, a gateway 22 can be provided to translate between the two standards' protocols. Communications from H.320 terminals typically conform to the ITU-T H.221 standard, in accordance with which information travels in "frames" of multiplexed video, audio, and data information. (These "frames" should not be confused with video frames, which we will hereafter refer to as "pictures" to distinguish them from transmission frames.) Each frame consists of one or more channels, each of which consists of eighty octets of bits, and each of the eight octet bit positions can be thought of as a separate subchannel within the frame; in general, certain bits of a given octet will contain video information, certain will contain audio information, and certain may contain data, as FIG. 2's first row illustrates. Additionally, the eighth bit in certain of a frame's octets (not shown in the drawings) represents control information by which, among other things, frame boundaries can be recognized. The precise bit allocation is determined during a session negotiation process among the involved videoconferencing terminals.

In contrast, H.323 terminals employ the Real-time Transmission Protocol (RTP) set forth in the Internet community's Request For Comments (RFC) 1889. An H.323 terminal employs separate RTP sessions to communicate a conference's video, audio, and data portions. The gateway's translation from H.221 to RTP therefore involves demultiplexing the H.221 data stream into its video, audio, and data constituents so that the gateway can packetize the video, audio, and data separately. The present invention is directed particularly to performing the protocol translation for the conference's video portion.

The video bits are extracted from a succession of octets and concentrated into a stream that thereby contains only the H.221 transmission's video part, which was encoded at the source in accordance with ITU-T Recommendation H.261. (Alternatively, it may have been encoded in accordance with a related recommendation, H.263. Although the present invention's teachings are equally applicable to such streams, we will concentrate on H.261 in order to avoid complicating the presentation unnecessarily.) In accordance with H.261, that stream is a sequence of error-correction-coded frames, of which FIG. 2's third row illustrates one.

Each frame begins with a synchronization bit ("S") and a fill bit ("F"). The gateway uses the synchronization bit in a manner described below to recognize the ECC-frame boundaries, and the fill bit indicates whether, as is sometimes required, the frame contains no actual information but is being sent to meet certain system timing requirements. The fill bit is followed by a 492-bit data or fill field and an eighteen-bit ECC field whose contents are generated on the preceding 493 bits (i.e., on a bit group that excludes the synchronization bit) in accordance with a (511, 493) BCH code that H.261 specifies.

For forwarding into a packet-switched network, the gateway discards the synchronization, fill, and ECC fields, as well as any data fields identified as being only fill, and concatenates the rest into a bitstream that it packetizes for transmission in accordance with the RTP protocol.

Figure 3:
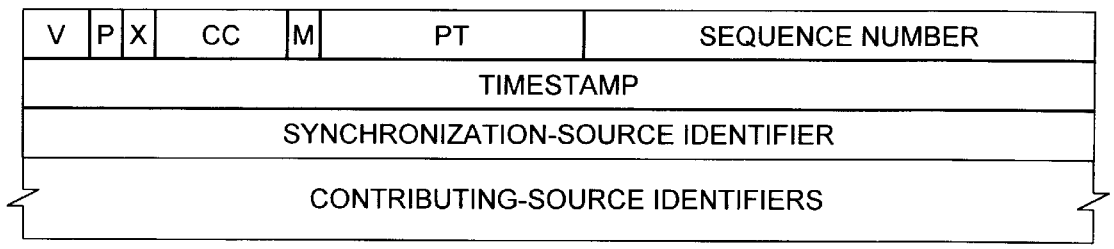
FIG. 3 is a diagram illustrating the format of a typical link-level packet used to transmit the video stream.

To place the packetization task in context, FIG. 3 illustrates a typical link-layer packet. If Ethernet is used for the link layer, the information is sent in an Ethernet frame that begins and ends with an Ethernet header and trailer, which are used for sending the information to the next stop on the same local network. For Internet use the frame's contents are an Internet Protocol (IP) datagram, which includes its own header, specified in RFC 791, for directing the datagram to its ultimate inter-network address. For some parts of the videoconference information, RTP specifies that the Transport Control Protocol be used as the transport protocol, i.e., as the protocol for directing the information to the desired application at the destination Internet address. For video streams, though, it specifies the User Datagram Protocol (UDP), so FIG. 3 depicts the IP payload as a UDP datagram, which includes a UDP header specified in RFC 768.

Since packet-switched protocol data units do not in general arrive in order, and since real-time information must be presented in a predetermined time sequence, the UDP payload must include information specifying the sequence in which the information was sent and its real-time relationship to other packets. So the payload begins with an RTP header, specified in RFC 1889, that gives this and other information. The present packetization discussion concerns itself with assembling the RTP header as well as a further, H.261 header, specified in RFC 2032, whose purpose will be more apparent after we describe the structure of the data stream being packetized.

Figure 4:
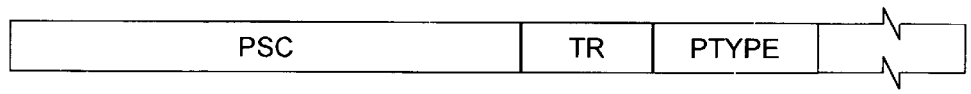
FIG. 4 is a diagram illustrating the RTP header of FIG. 3.

Before we turn to that description, however, we will first consider the RTP header format, which FIG. 4 depicts as successive four-byte rows. RFC 1889 describes the various FIG. 4 fields' purposes in detail, so we will mention only the timestamp field, which is particularly relevant here. When information travels by way of a packet-switched network, different constituent packets make their ways to their common destination independently. That is, different packets can take different routes, so the times required for different packets to arrive at their respective destinations are not in general the same, and packets can arrive out of sequence or in time relationships that otherwise differ from those with which their contained information was generated. Moreover, the UDP sessions in which the video data are sent typically are not the ones used to send the audio that is to be played with it. RTP therefore provides for a timestamp in each packet to indicate the real-time relationships with which the information is to be played.

In contrast, although video arriving at the gateway in an H.221 stream will have been digitized and typically time-division multiplexed, it will have been sent over a circuit-switched channel, so a common frame will contain both a video segment and the audio segment to be played with it. H.221-stream timing relationships are therefore implicit: the H.221 data stream coming into the gateway needs no explicit timestamp and therefore has none. So the gateway consults a local clock to provide the RTP-required timestamp as it assembles the outgoing packets.

Without more, though, it would be complicated to play the resultant timestamped information. If no notice were taken of the actual contents of the data stream being packetized, for example, a single packet could contain parts of two different video pictures, so parts of the same picture would have the same timestamp, while different parts of the same picture could have different timestamps. To avoid this, the gateway described here monitors the data stream for picture boundaries, as will now be described.

Figure 2:
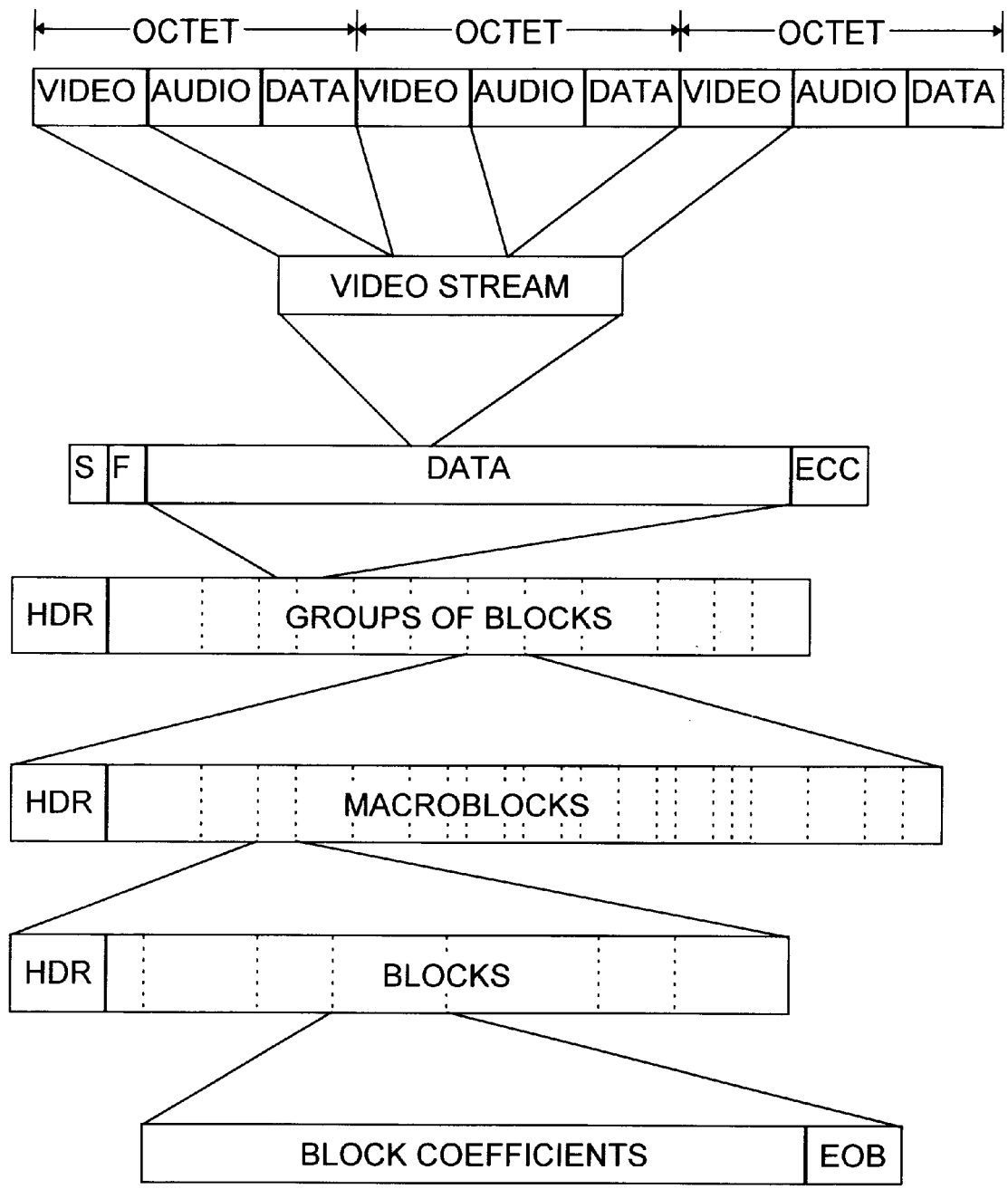
FIG. 2 is a diagram that illustrates the format of a video stream of the type that the gateway of the present invention will typically process.
Figure 5:
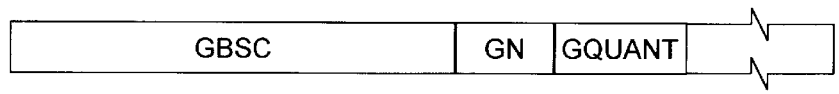
FIG. 5 is a diagram illustrating the header of a single-picture portion of the video stream.

FIG. 2's fourth through seventh rows depict the structure that the incoming data stream uses to represent successive video pictures in accordance with H.261. The fourth row illustrates a data-stream portion covering a single vide picture. It shows that the portion begins with a header, and FIG. 5 illustrates that header's structure.

The header field of importance here is the Picture Start Code (PSC). For H.261 streams, that field value is always $00010_H$, a sequence that cannot occur elsewhere in the data stream. To avoid having packets straddle picture boundaries, the gateway begins a new packet whenever it encounters the PSC sequence.

In the case of a packet containing the PSC sequence, the gateway determines the timestamp simply by consulting the current local-clock output. But the length of a single-picture portion of the data stream typically exceeds the underlying protocol's maximum-transmission-unit size, so the gateway breaks a single picture's data into multiple packets. For such packets, the timestamp entered is the same as that assigned to the last PSC-containing packet.

Figures 6, 8, 10:
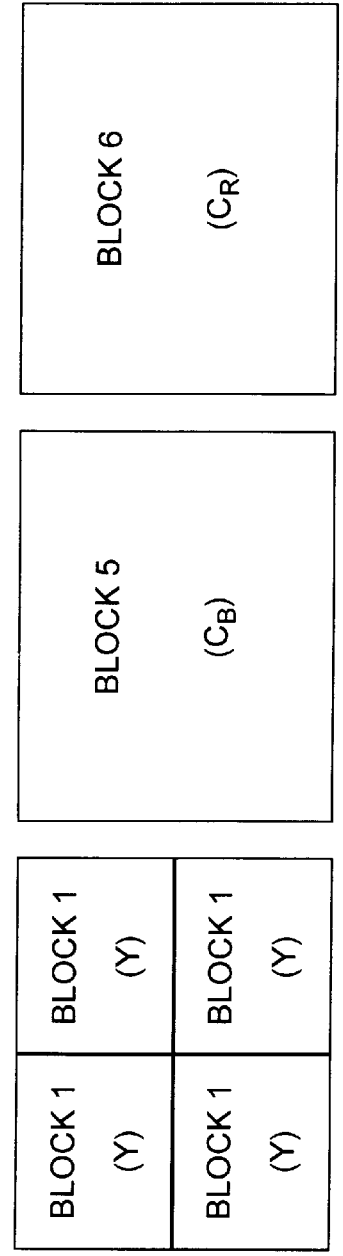
FIG. 6 is a diagram of a single picture's division into groups of blocks ("GOBs")
FIG. 8 is a diagram illustrating a single-GOB picture segment's division into subregions represented by respective "macroblocks"
FIG. 10 is a diagram illustrating a macroblock region's coverage by its constituent blocks.

The gateway is also judicious in its selection of locations at which it breaks a picture's data into packets. The reason for this can be appreciated by reviewing the picture data's finer structure. As FIG. 2's fourth row indicates, the picture data's body portion is divided into "groups of blocks" (GOBs). H.261 specifies a Common Intermediate Format (CIF) into which, say, an originally 525- or 625-line (or other) source representation is resampled to generate the H.261 representation, and each GOB represents one-twelfth of the resultant picture area, in a spatial relationship that FIG. 6 illustrates. H.261 also specifies an alternative, more-sparsely sampled "QCIF" format. When QCIF is employed, each GOB represent one-third of the total picture area. And the present invention's principles are applicable to other formats, too, such as those that H.263 specifies.

FIG. 2's fourth row depicts the GOB fields as being unequal in length. This is because the degree of H.261-specified data compression depends on the source picture's data redundancy, which can differ from region to region.

Figure 7:
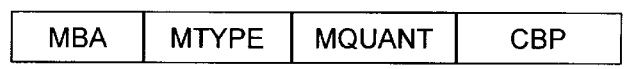
FIG. 7 is a diagram illustrating the header of a GOB portion of the video stream.

FIG. 2's fifth row shows that each GOB field has its own header, and FIG. 7 illustrates a GOB header's structure. The GOB header begins with a Group-of-Blocks Start Code (GBSC). That code's value is $0001_H$, a sequence that cannot occur elsewhere (except in the PSC). The gateway described here monitors the data stream for GBSC sequences and begins a new block only at such sequences. To appreciate why it does so, we review the rest of the data stream's structure.

The GOB's Group Number (GN in FIG. 7) follows the GBSC code and specifies the GOB region's position in accordance with the FIG. 6 scheme. Next is a default quantization value GQUANT, which influences the contained data's interpretation by specifying the magnitude intervals at which the values were quantized. The header may additionally contain further, optional fields.

Figure 9:
FIG. 9 is a diagram illustrating a macroblock header.

FIG. 2's fifth row shows that a GOB is divided into so-called macroblocks, which correspond to subregions within the GOB regions. FIG. 8 illustrates a single-GOB picture segment's division into subregions represented by respective macroblocks. Although there are thirty-three such subregions in a GOB-represented region, FIG. 2 depicts somewhat fewer macroblocks than that, because macroblocks that are redundant in view of previous macroblocks can be omitted in accordance with H.261. (As those familiar with the H.261 specification will recognize, previous may have either a temporal or a spatial meaning; that specification admits of a variety of data-compression techniques.) FIG. 2's sixth row shows that each macroblock has its own header, and FIG. 9 illustrates that header's structure. The header's MacroBlock Address (MBA) field contains a variable-length code for the difference between the current macroblock's address and that of the previously sent GOB's block (since not all macroblocks are sent for every GOB). The MTYPE field specifies the manner in which the current macroblock's data were encoded; the data may be the result of comparing the raw data with a neighbor macroblock's data, with the corresponding data from a previous picture, with filtered versions of either of them, etc. If an MQUANT field is present, its contents supersede the default quantization that the GQUANT field in the enclosing GOB's header specifies.

The CBP field specifies the macroblock's constituent "blocks" for which the macroblock field contains data. There are at most six such blocks. The first four represent the luminance (Y) information from respective segments of a macroblock subregion divided as FIG. 10's left rectangle illustrates. The fifth and sixth block fields represent more-sparsely sampled blue ($C_B$) and red ($C_R$) color-difference values covering the whole macroblock region, as FIG. 10's center and right rectangles indicate. Each block field's contents are coefficients of an 8×8 discrete cosine transform of the data that remain after any subtraction by previous-image data.

In short, the data interpretation for each macroblock depends greatly on its header and that of the enclosing GOB. This would complicate decoding at the receiving end if packets were allowed to start between block or macroblock boundaries; the decoding of a given packet's contents would have to await reception of packets containing the requisite headers. To avoid such a complication, the illustrated gateway begins packets only at GOB boundaries.

Figure 11:
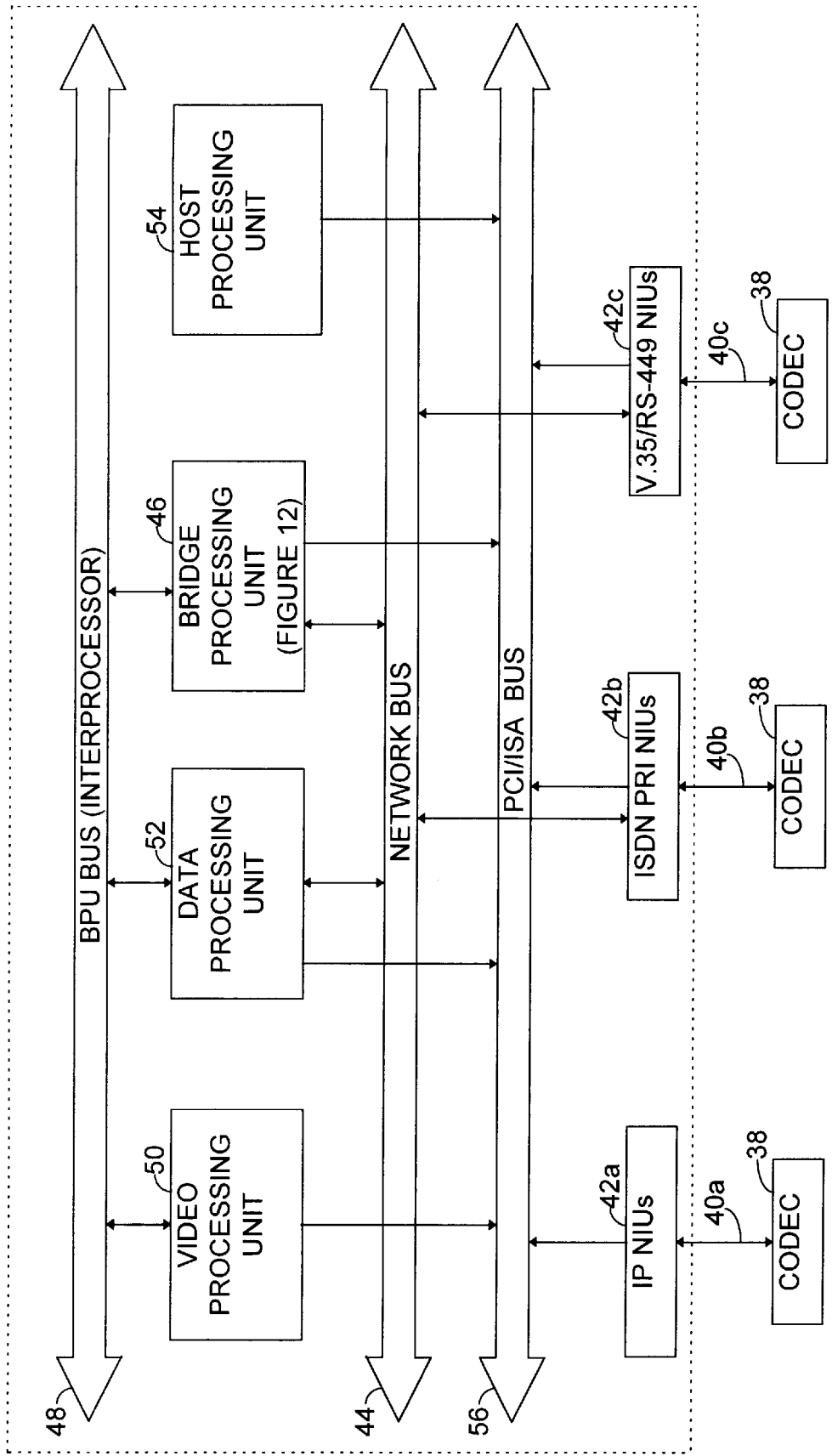
FIG. 11 is a diagram of a multipoint control unit ("MCU") of a type that can embody the present invention.

Although FIG. 1 depicts the gateway 22 as separate from the MCIJs 20, the gateway can be implemented in an MCU, such as the MCU illustrated in U.S. Pat. No. 5,600,646 to Polomski, which we hereby incorporate by reference. FIG. 11 depicts the major constituents of such an MCU adapted in accordance with the present invention's teachings. Participants in a teleconference employ codecs 38 to generate audio, video, and/or data signals that they send over various communications media 40a–c to the MCU for appropriate distribution to other participants.

FIG. 11 adapts the Polomski arrangement so that it can communicate not only over circuit-switched networks, such as T1 or ISDN, but also packet-switched networks, such as the Internet. Network interface units 42a–c perform the low-level processing necessary to extract the information from respective media and apply it to respective channels on the network or PCI/ISA bus 44 or 56. A bridge processing unit 46 performs the distribution by obtaining signals from various of that bus's channels and applying appropriately processed versions thereof to others of its channels for re-transmission.

The signals to be transmitted may have resulted from the bridge processing unit 46's having first exchanged the received signals over an interprocessor bus 48 with a video processing unit 50 or other data processing unit 52 in order, say, to mix two sources' information into a composite signal so that two participants' images are combined into a common picture. In accordance with the present invention, moreover, the bridge processing unit 46 may perform an inter-protocol translation, as will be further described below. A host processing unit 54 employs an Industry Standard Architecture bus 56 to exercise control over the various elements, partially in response to information received from the network interface units 42a–c.

Figure 12:
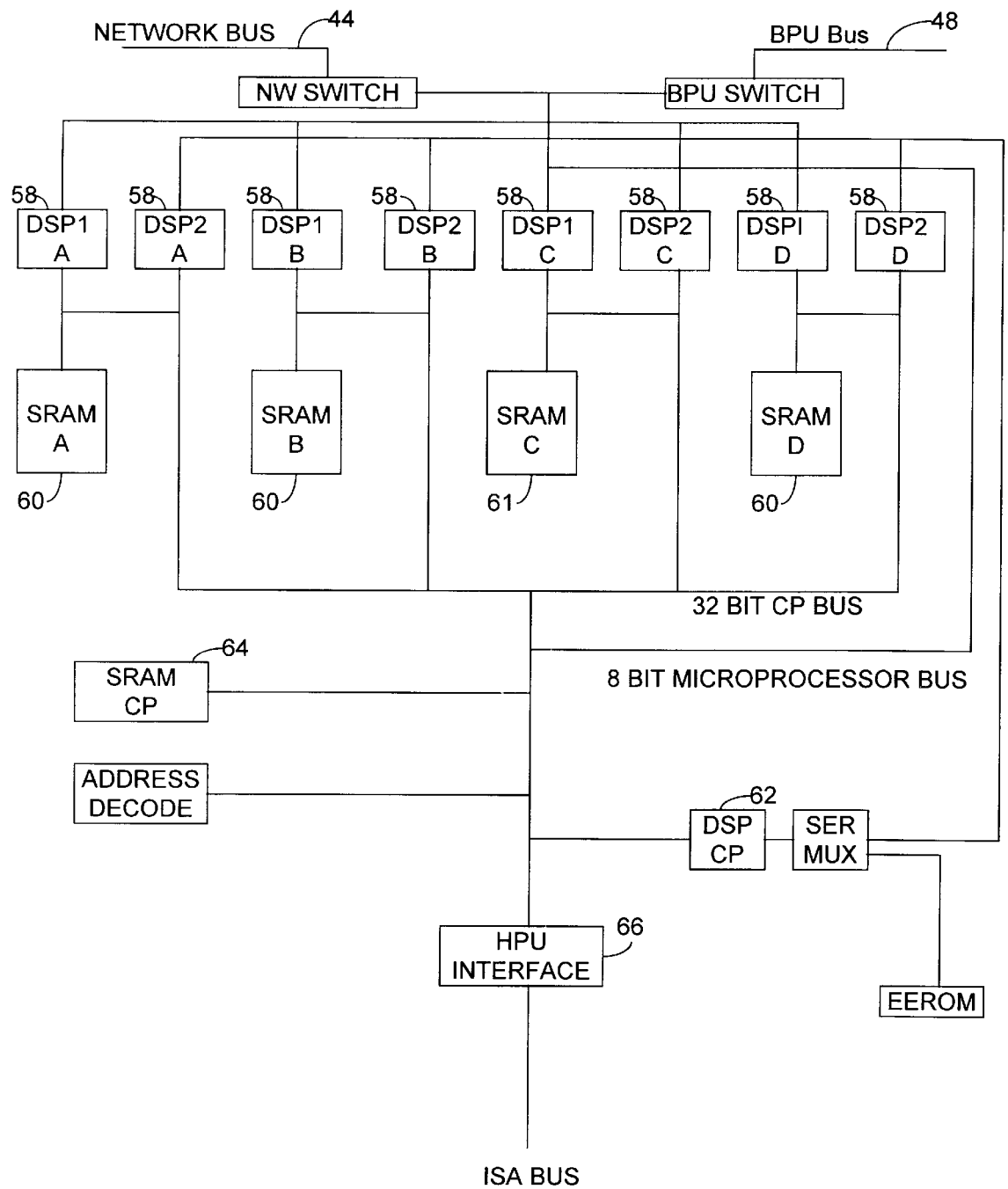
FIG. 12 is a more-detailed diagram of the bridge processing unit depicted in FIG. 11.

As the Polomski patent describes in more detail, the core of the bridge processing unit 46 is a group of digital signal processors (DSPs) 58 shown in FIG. 12. The DSPs operate in pairs whose constituent processors are labeled "DSP1" and "DSP2." Those labeled "DSP1" primarily perform aspects of interfacing with the network bus 44, while those labeled "DSP2" perform processing more closely connected with transfers over bus 48 to other processor pairs. Each pair is associated with a respective conference participant.

A respective static RAM 60 is associated with each DSP pair and provides fast shared-memory communication between the pair's constituent DSPs. It also provides shared-memory communication between the DSP pair and a common control DSP 62, which performs higher-level, less-time-sensitive tasks. That processor in turn has access to a further memory 64, to which the host processor 54 (FIG. 11) also has access by way of an ISA interface unit 66. The Polomski patent describes most of these and other components' operations in detail, so we will describe only of the gateway-function programming that we have added.

Figure 13:
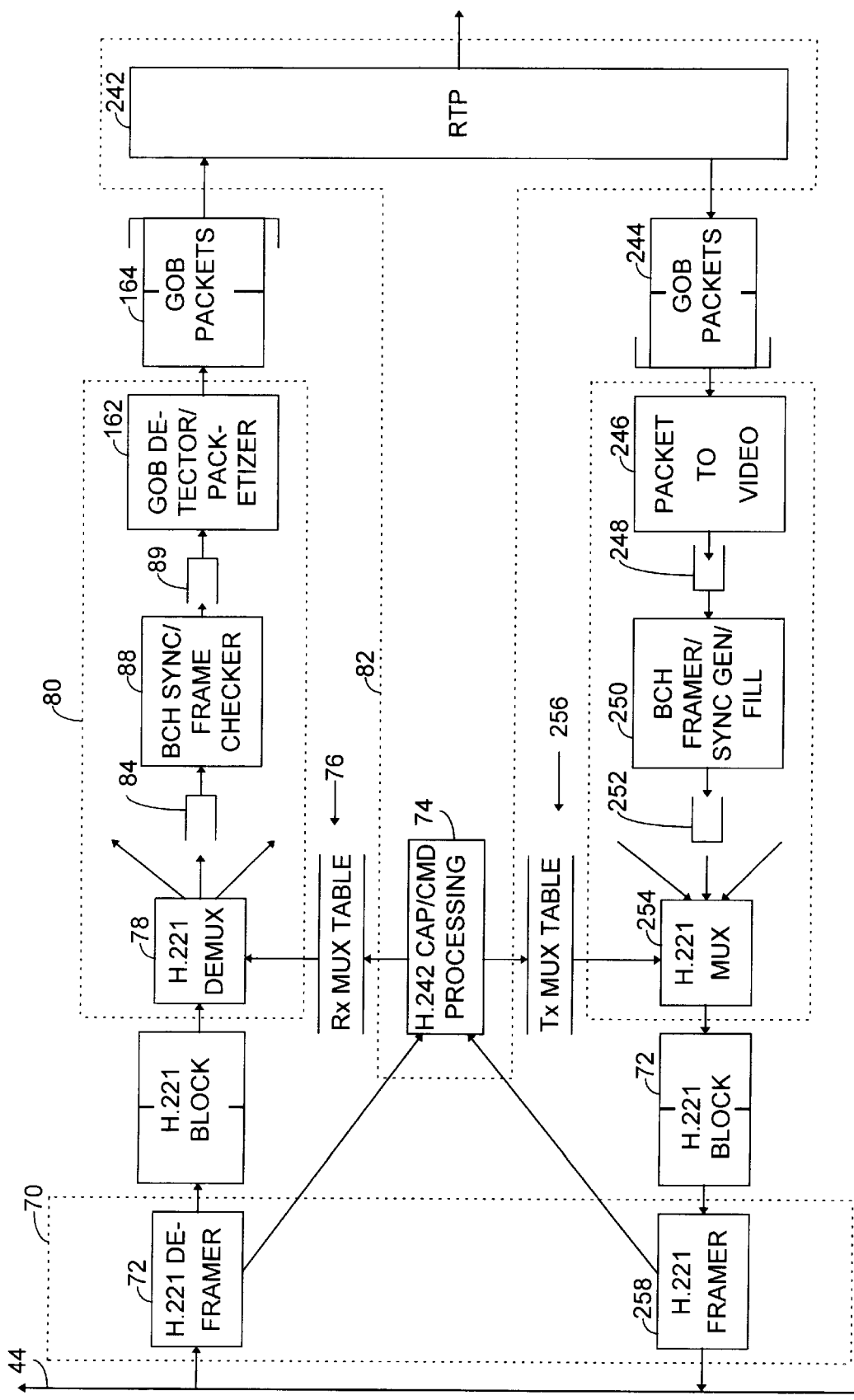
FIG. 13 is a data-flow diagram used to describe the bridge processing unit's implementation of the present invention.

FIG. 13 illustrates the gateway-function data flows. Blocks within dashed lines 70 represent processes that a FIG. 12 DSP pair's "DSP1" member performs. Process 72 is a conventionally performed operation of determining where the 80n-octet H.221 frame boundaries occur. Once those boundaries are located, one can determine the bit locations of command and capacity codes (not shown in FIG. 2's first row), some of which specify the video information's bit positions. From this information a process 74 can generate and place into the respective RAM 60 (FIG. 12) a table 76 containing masks and related information that a de-multiplexing operation 78 uses to perform the video-stream extraction that the transition between FIG. 2's first and second rows represents. Dashed lines 80 indicate that a "DSP2" member of a DSP pair performs the de-multiplexing operation 78. Dashed lines 82 indicate that their included processes are performed by FIG. 12's control DSP 62 or FIG. 11's host processor 54. In particular, DSP 62 performs the capability/command processing 74.

The demultiplexing process produces video, audio, and data steams that undergo various processing before being placed in their respective IP datagrams for transmission. For present purposes, we will consider only the video stream's processing. That processing places the stream represented by FIG. 2's second row into a bit buffer 84. During steady-state operation, a BCH frame-checking process 88 verifies that the synchronization bits are where they are expected to be and checks the ECC (FIG. 2's third row). If all is in order, it then discards the contents of the sync, fill-indicator, and ECC fields, as well as any data-field contents tagged by the fill-indicator field as fill, and places the remaining bits into a successor bit buffer 89 (FIG. 13).

Figure 14:
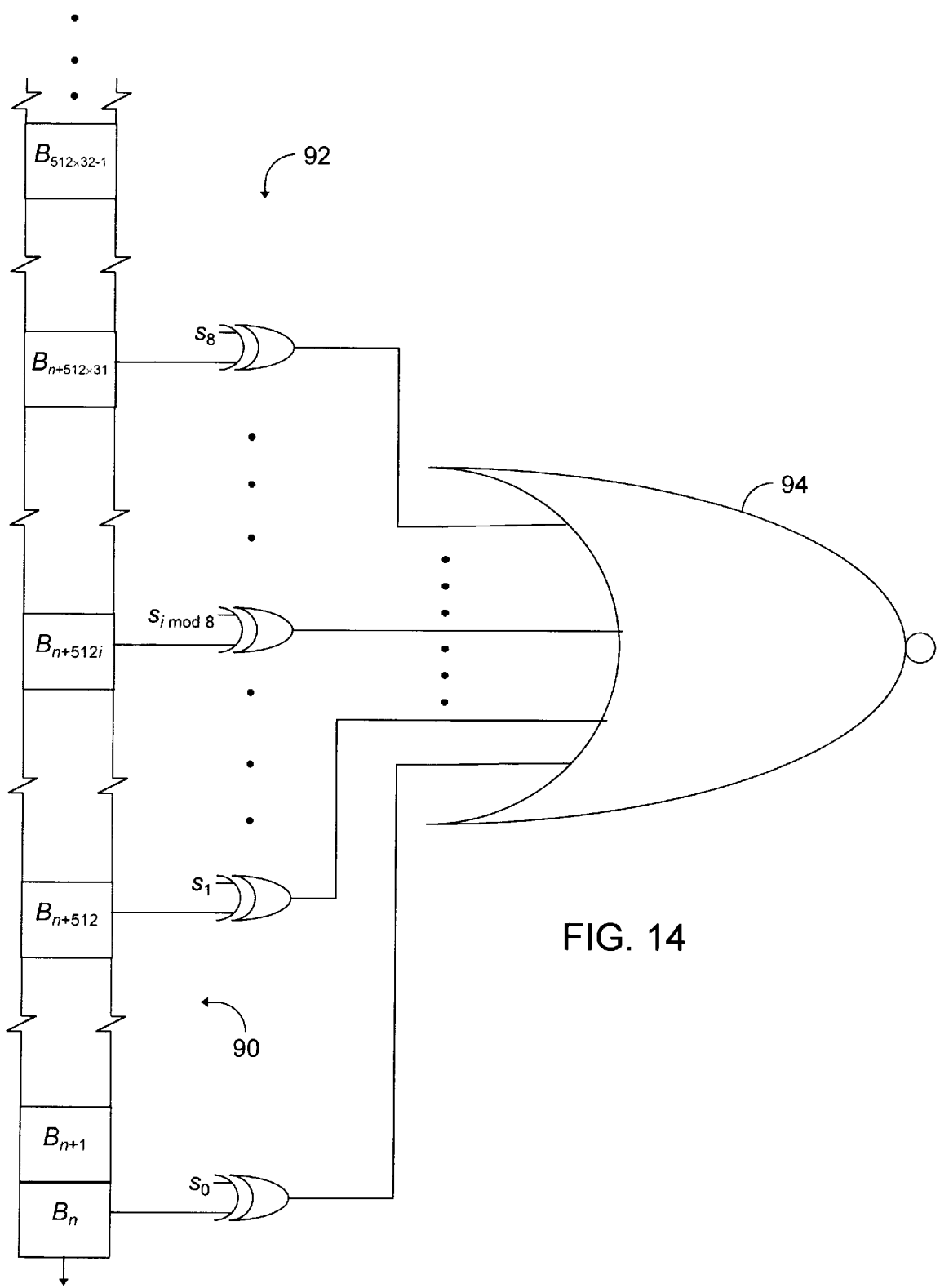
FIG. 14 is a conceptual logic diagram of the synchronization operation performed by FIG. 13's process 88.

Initially, though, process 88 does not "know" where to look for the BCH field boundaries. So before it begins its steady-state function, it performs a synchronization routine whose principle FIG. 14 depicts conceptually. As was explained above in connection with FIG. 2's third row, a synchronization (S) bit precedes each 511-bit (data plus ECC) BCH code word. In accordance with H.261, successive frames' synchronization bits-i.e., a first synchronization bit and every 512th data-stream bit thereafter-repeatedly form a frame-alignment sequence $S_0S_1S_2S_3S_4S_5S_6S_7$= (00011011). To detect this sequence, the synchronization routine forms a longer, thirty-two-bit alignment sequence consisting of four repetitions of H.261 's eight-bit pattern. It then conceptually loads the contents of FIG. 13's bit buffer 84 into FIG. 14's 16K-bit-long (conceptual) shift register 90 and, as thirty-two (again, conceptual) XOR gates 92 indicate, compares every 512th bit with a corresponding bit of the long alignment sequence. If all the bits match, a NOR gate 94 produces a true output.

A true output is a relatively reliable indicator that the BCH-frame boundaries have been found; the probability is less than one in four billion that thirty-two randomly chosen bit values will form four successive repetitions of the alignment pattern. So the steady-state mode of FIG. 13's process 88 can begin if NOR gate 94's output is true.

Otherwise, the synchronization process repeatedly advances the shift register's contents by one bit and repeats the comparison until it finds a match. FIG. 14 shows the shift-register state after n such advances.

Figure 15:
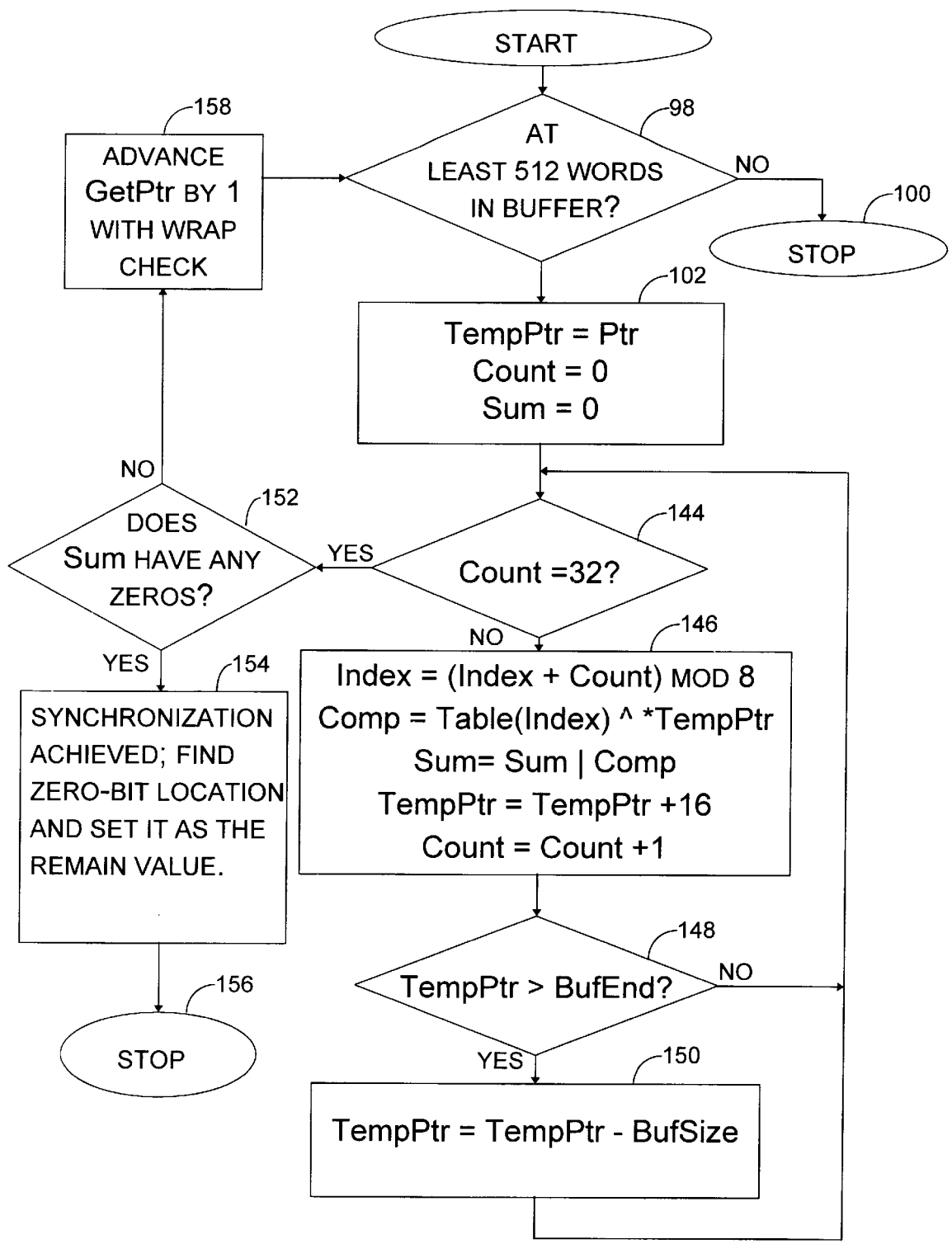
FIG. 15 is a flow chart of a routine for implementing that operation in software.

Unfortunately, it usually is not practical to obtain this reliability by the straight-forward approach that the bit-stream organization suggests, i.e., by implementing the synchronization process in dedicated logic circuitry like that of FIG. 1. Dedicated-circuitry use would not take advantage of the signal-processing circuitry that the system will already have for other purposes. In the absence of the present invention's teachings, on the other hand, an algorithmic approach, which is necessary if the system's general-purpose digital-signal-processing circuitry is to be employed, could seriously detract from that circuitry's ability to perform its other tasks. But we have found that we can so reorder the synchronization process's operations as to reduce this burden to a small fraction of what it would be otherwise. FIG. 15 depicts the way in which we achieve this reduction.

FIG. 15 illustrates a synchronization routine that FIG. 13's process 88 calls periodically until it achieves synchronization. As blocks 98 and 100 indicate, the synchronization routine first determines whether FIG. 13's bit buffer 84 contains 512 thirty-two-bit words, i.e., enough bits to fill FIG. 14's conceptual shift register 90. If not, the synchronization process stops until its next invocation. But once FIG. 13's demultiplexing process 78 has placed enough bits into the bit buffer 84, the FIG. 15 routine advances to step 102, in which it obtains a value GetPtr from a control structure in buffer 84. To explain GetPtr's function, we digress to a discussion of bit buffer 84, which is implemented as a circular buffer in a block of FIG. 12's RAM 60 memory assigned to that purpose and accessed by reference to the associated control structure.

We call buffer 84 a bit buffer because it is an object implemented by methods that calling processes can use to add or remove numbers of bits that do not constitute whole numbers of memory words. This individual-bit approach employs a control-structure location PutWord in addition to the main bit-buffer storage locations. Received bits are written into a main bit-buffer memory location only when enough bits have been received to make a complete memory word. In the interim PutWord receives newly received bits in its leftmost unoccupied bit positions.

Figure 16:
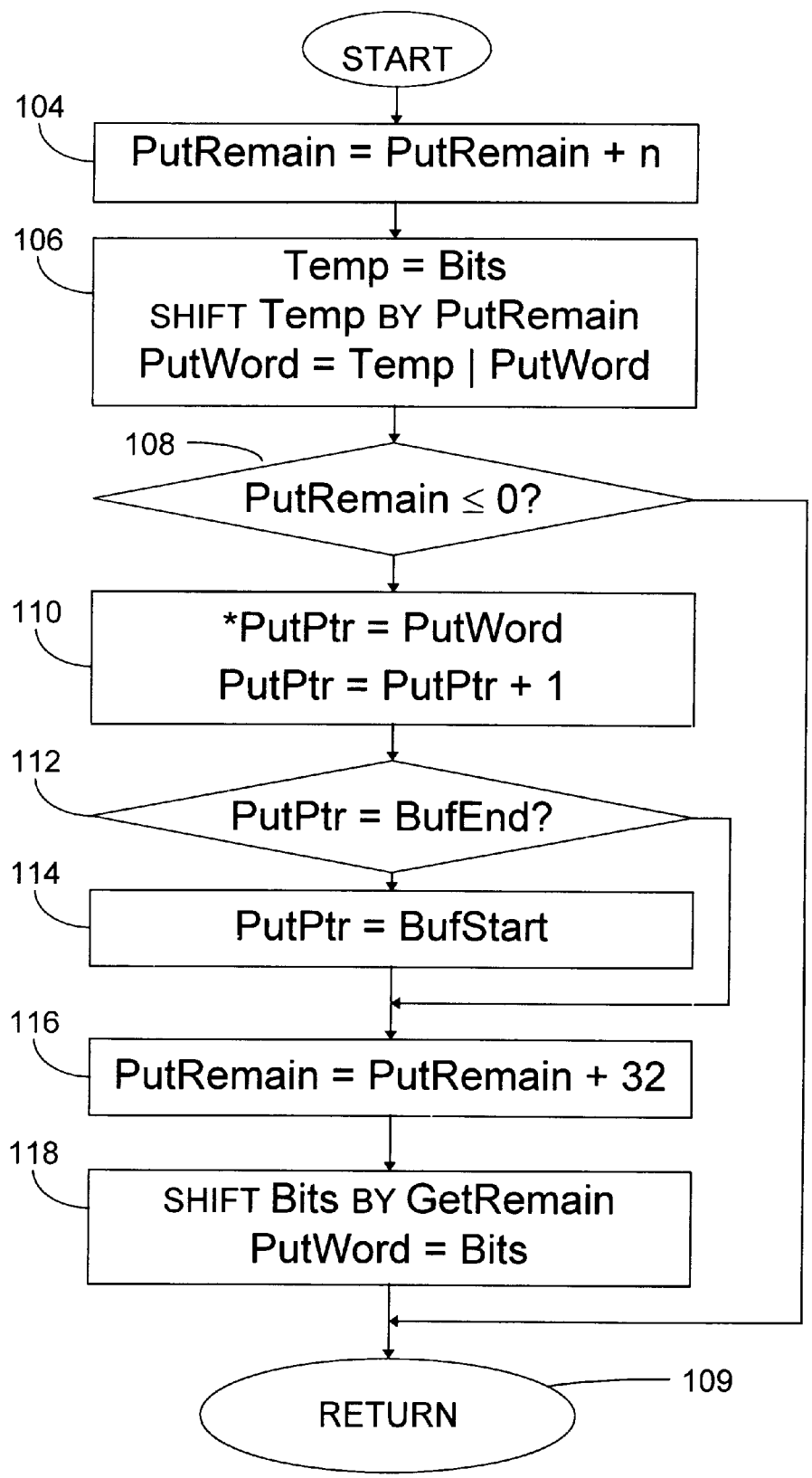
FIG. 16 is a flow chart of a routine for storing data in FIG. 13's bit buffer 84.

More specifically, the buffer's bit-storage method takes as two of its arguments the number n of bits to be stored and an unsigned thirty-two-bit word Bits whose n right-most bit positions contain the bits to be stored and whose other bit locations contain zeroes. As FIG. 16's blocks 104 and 106 indicate, that routine begins by subtracting n from a control-structure value PutRemain, which before the subtraction pointed to PutWord's rightmost occupied bit position. Afterwards, if PutRemain is still positive, it points to the rightmost position that the newly added bits will occupy. The routine then aligns Bits's contents with PutWord's empty bit positions by bit-shifting a copy of the new-bitcontaining word Bits by PutRemain bits. Positive and negative PutRemain values respectively result in left and right bit shifts. PutWord's contents are then ORed bitwise with the shifted value and replaced by the result. (Block 106 uses the C-language symbol "|" for the bitwise-OR operation.) If PutRemain is positive, all of the new bits have been added to PutWord, but PutWord is not yet full, so this is the end of the routine, as blocks 108 and 109 indicate.

On the other hand, a zero or negative resultant PutRemain value means that the interim container PutWord is now full, and a negative value means that PutWord did not have enough room for all of the new bits. In both cases a full word is ready to be stored, so PutWord's contents are loaded into the memory-block location that a control-structure pointer PutPtr specifies (as block 110's C-language dereference operator "*" indicates), and that pointer is then incremented. If the result equals a control-structure value BufEnd, which points to the location just beyond the end of the bit-buffer's memory block, the storage operation is wrapped to the start of the memory block by assigning to PutPtr a control-structure value BufStart, which points to the buffer memory block's first location. Blocks 112 and 114 represent that operation.

In each case in which PutRemain is zero or negative, PutWord then receives any of Bits's bits not previously stored. In those cases PutRemain is incremented by thirty-two to a positive value that points to the leftmost PutWord bit position to be occupied by the remaining bits, another copy of Bits is left-shifted for alignment by the resultant PutRemain value, and the result is stored in PutWord, as blocks 116 and 118 indicate. The routine then terminates, as block 109 indicates.

Having described the bit buffer's bit-storage method, we can now describe its bit-removal method, in which the control-structure value GetPtr whose use in FIG. 15 prompted the current digression comes principally into play. GetPtr is similar to the pointer PutPtr used in the bit-addition method, but it points to the location from which bits are to be removed rather than into which bits are to be stored. Removing bits from the bit buffer involves passing a bit-removal routine a value n, representing the number of bits to be removed. The bit-removal routine returns an unsigned thirty-two-bit word containing, in its n rightmost bit positions, the leftmost n bits not previously retrieved from the memory-block location that GetPtr specifies. In doing so it employs a control-structure value GetRemain that is similar to PutRemain except that the bit position to which GetRemain points is in the main bit-buffer storage block rather than the control structure. Also, GetRemain is used primarily to cause right shifts instead of left shifts, so it represents that position as a negative number.

Figure 17:
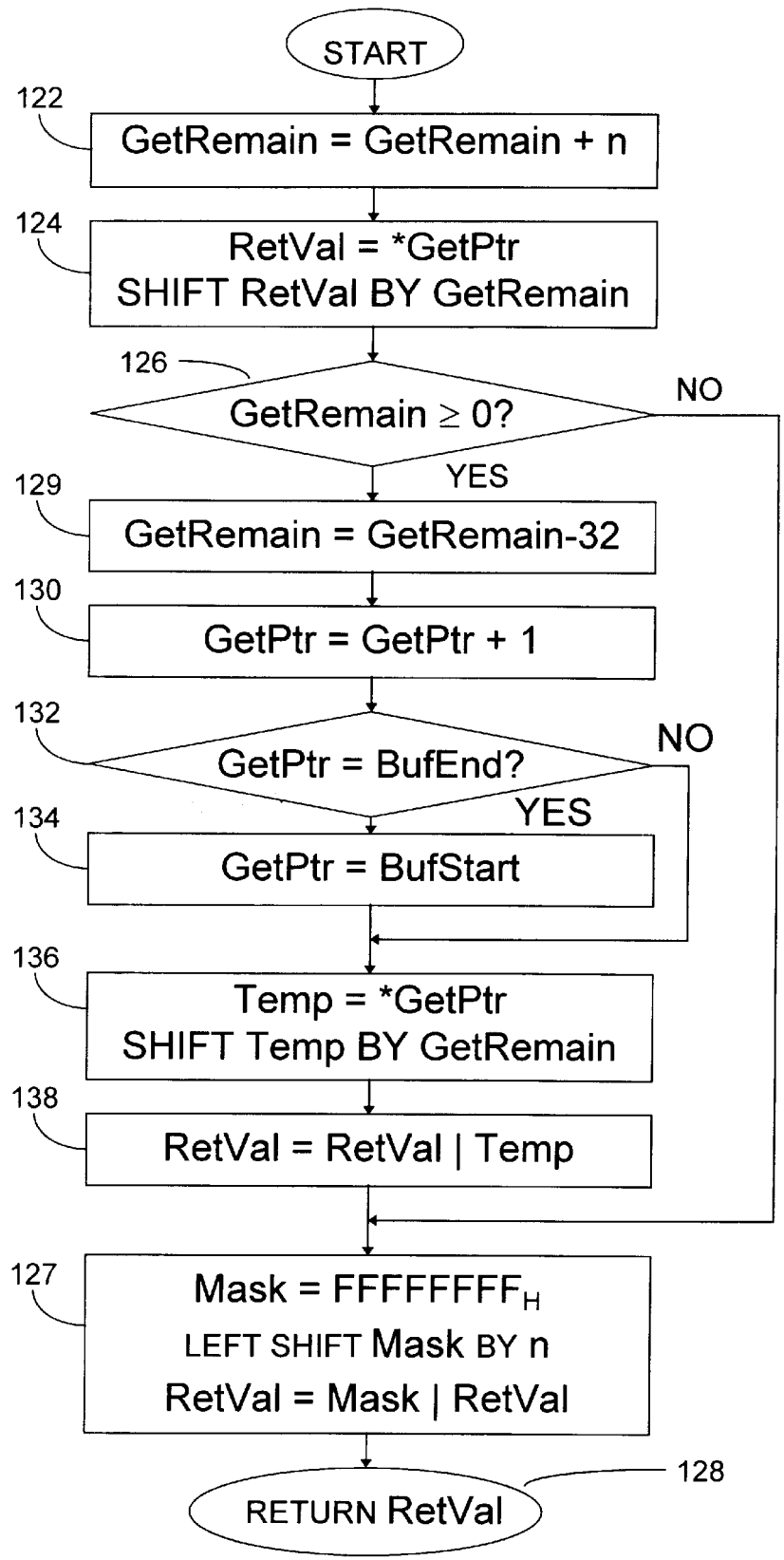
FIG. 17 is a flow chart of a routine for fetching data from FIG. 13's bit buffer 84.

FIG. 17 illustrates the bit-removal routine, which begins by adding to the negative GetRemain value the positive number n of bits to be removed, as block 122 indicates. So long as the result is not positive, GetRemain thereby points to the last bit position from which data are to be removed during the current operation. An unsigned thirty-two-bit RetVal quantity, which will become the routine's return value, receives the GetPtr-specified location's contents bit-shifted by the thus-incremented GetRemain value, as block 124 indicates. As before, positive and negative GetRemain values respectively specify left and right shifts. If the GetRemain value is negative, the resultant shift right justifies the desired bits, the routine places zeroes in all RetVal bit positions that received bits not to be removed from the bit buffer, and the routine returns RetVal to the calling process, as blocks 127 and 128 indicate.

If the GetRemain has become positive, the other hand, it is because the user process requested more bits than remained unretrieved in the GetPtr-specified memory location, and the resultant (left) shift in RetVal provides room for further bits, which must be retrieved from the next memory location. To that end, any non-negative GetRemain value is decremented by the memory-location size, thirty-two, as blocks 126 and 129 indictate, to yield a negative number that points to the bit position in the next memory location, from which the last of the remaining bits will be fetched. As block 130 indicates, the routine then increments by one the control structure's GetPtr value, which thereby points to that memory location. As before, if the result points to the BufEnd-specified location just past the end of the buffer's memory block, GetPtr is reset to Bufstart, as blocks 132 and 134 indicate. In any case, a copy of the GetPtr-specified location's contents is then right-shifted by GetRemain bits to right justify it, as block 136 indicates. Block 138 represents replacing the return value RetVal, in which a previous left shift provided room for the added bits, with the results of bitwise ORing it with the right-justified version of the fetched word.

Finally, as blocks 127 and 128 indicate, zeros are placed in RetVal positions that do not contain retrieved bits, and the routine ends.

Having described the operation of the FIG. 13 bit buffer 84 from which process 88 fetches its input, we now return to FIG. 15's representation of the synchronization routine that process 88 performs before it begins its steady-state process of removing BCH frames from buffer 84 and placing the frames'data contents into the next bit buffer 89.

As was explained above, the FIG. 15's routine's purpose is to obtain the synchronization that would result from the FIG. 14 operation. The FIG. 14 operation comprises (1) taking every 512th bitstream bit, for thirty-two such bits, (2) comparing the resulting sequence with a thirty-two-bit synchronization sequence, i.e., with four repetitions of the eight-bit synchronization sequence, and, (3) if the match is perfect, reporting that synchronization has been achieved. If the match is not perfect, the FIG. 14 operation is repeated with a one-bit shift, and this continues until synchronization is achieved. According to the present invention, however, the FIG. 15 routine achieves the same result but uses a different operational sequence, one that reduces the number of required machine cycles to a small fraction of the number otherwise required.

The key to our approach is to perform a succession of steps in which each comparison is not with the thirty-two-bit synchronization sequence but, as will now be explained, with thirty-two repetitions of an associated single bit of sequence. As block 102 indicates, the synchronization routine initializes a pointer TempPtr with GetPtr's contents, i.e., with an index to the bit-buffer-84 location from which the first data will be fetched when process 88 begins its steady-state operation. Block 102 also represents initializing variables Sum, whose purposes will become apparent as the description proceeds, and Count, which the synchronization routine tests in step 144 to determine whether it has completed an inner loop thirty-two times.

If the routine has not completed the inner loop thirty-two times, it circularly increments Index, which is a variable that addresses an eight-entry table. Each table entry consists of thirty-two repetitions of a respective one of the eight alignment-sequence bits.

For instance, the first entry is $00000000_H(S_0=0)$, while the fourth entry is $FFFFFFFF_H$ ($S_3=1$). It is this word-width replication of a single synchronization-sequence bit, rather than the thirty-two-bit synchronization sequence itself, that is compared with bits from the bitstream: step 146 represents a bitwise comparison of the chosen table entry with the Is thirty-two bits in the TempPtr-addressed bit-buffer word. (The drawing uses the C-language bitwise-exclusive-OR operator "^" to represent the comparison operation.) By employing this approach, we need only one bit-buffer access for each comparison rather than thirty-two. Yet the overall result is equivalent, as the remainder of the operation's description will show.

When Index=0, this comparison represented by block 146's second line corresponds to the operation of FIG. 14's bottom XOR gate on thirty-two successive bits. As block 146's third line indicates, the comparison result is ORed bitwise with the contents of Sum, which contains the result of previous such bitwise-OR operations. This corresponds to a partial operation of FIG. 14's NOR gate 94 through thirty-two successive one-bit advances through the shift register 90.

When Sum has been updated, the routine advances through the bit buffer by sixteen words=512 bits-i.e., by the length of a BCH frame-as block 146's fourth line indicates. As FIG. 15's blocks 148 and 150 indicate, this may involve wrapping back around the beginning of the bit-buffer memory block.

The loop represented by blocks 144, 146, 148, and 150 is repeated thirty-two times. In each repetition the routine jumps forward in the bit buffer by the length of a single BCH frame and circularly advances through the alignment-sequence table by a single entry. When the process has completed an outer loop consisting of thirty-two inner-loop traversals (corresponding to FIG. 14's thirty-two XOR gates), the Sum variable's contents are the concatenated outputs of FIG. 14's NOR gate 94 for thirty-two successive advances along the shift register 90.

As FIG. 15's blocks 152 and 154 indicate, synchronization has been achieved when any Sum bit location still contains a zero after the thirty-two inner-loop traversals. In the GetPtr-indicated word of FIG. 13's bit buffer 84, the bit corresponding to Sum's zero-containing bit position is a BCH code-word boundary, as is each 512th bit thereafter. As FIG. 15's Block 156 indicates, the routine stops when synchronization has been reached, and it returns a value that causes FIG. 13's process 88 to begin its steady-state operation.

But each traversal of FIG. 15's outer loop covers only thirty-two bits in each of thirty-two 512-bit BCH fields, so most loops do not locate boundaries. Block 158 indicates that in those situations the process repeats the outer loop after incrementing the pointer GetPtr that identifies the first bit-buffer location from which data will be fetched in steady-state operation, i.e., after effectively discarding bit buffer 84's first thirty-two bits, which will not be within boundaries that the process will locate. Since thirty-two bits have been discarded, the bit buffer may no longer contain the 512 bits required for a single outer loop, in which case the routine stops until it is called again, as blocks 98 and 100 indicate.

An even faster alternative, which the drawing does not illustrate, involves additionally testing Sum for zeroes even when Count is less than thirty-two. This could be done just before step 144. If Sum still has zeroes, then the routine proceeds as the drawing indicates. If it does not, the routine proceeds directly to step 158.

In the worst case, the routine must advance through 512 total bits/sync bit×8 sync bits/alignment sequence÷32 bits/outer loop=128 outer loops to achieve synchronization and the successful routine termination that block 156 represents.

Figure 18A:
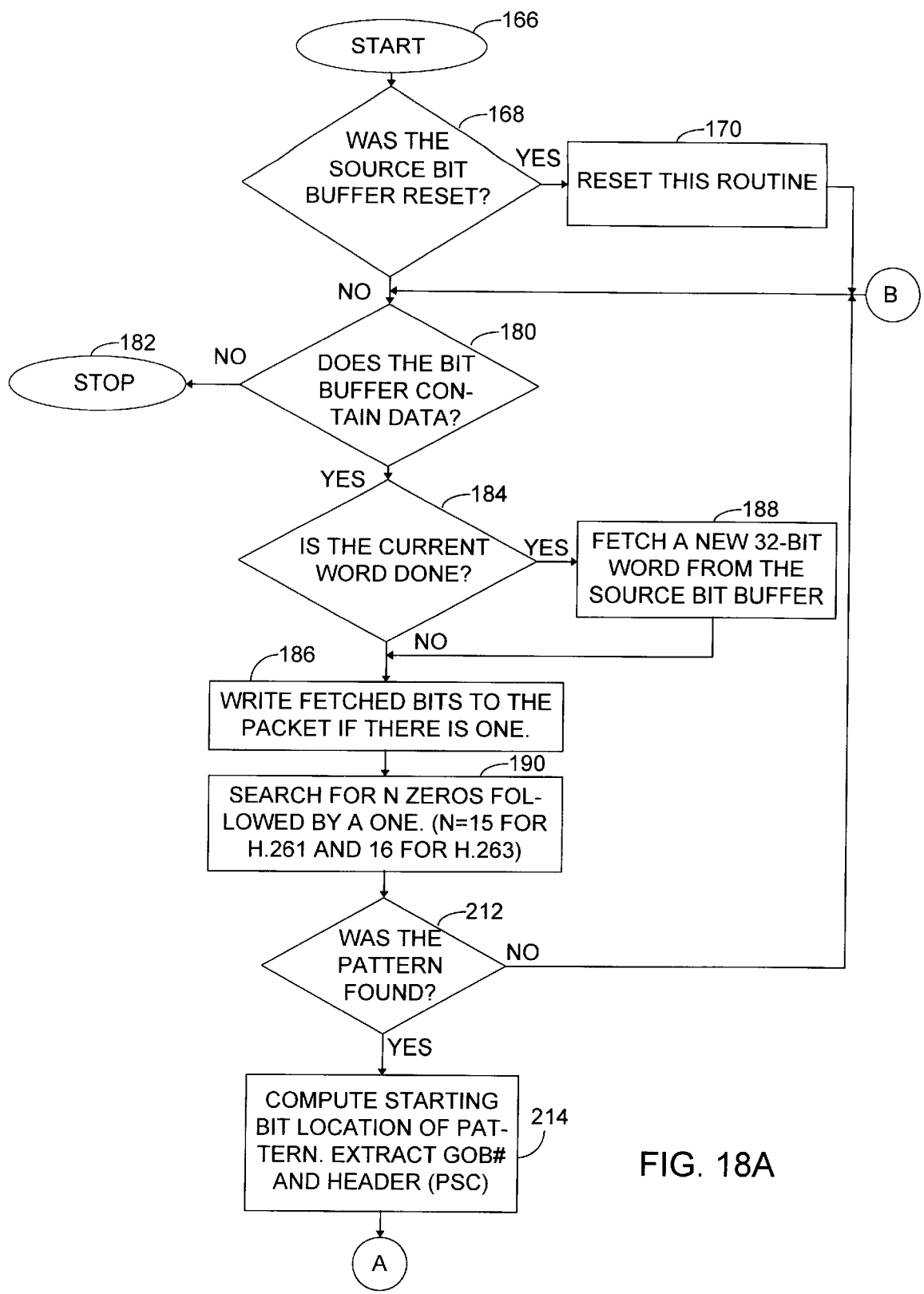
FIGS. 18A and 18B together form a flow chart of FIG. 13's packetizing process 162.
Figure 18B:
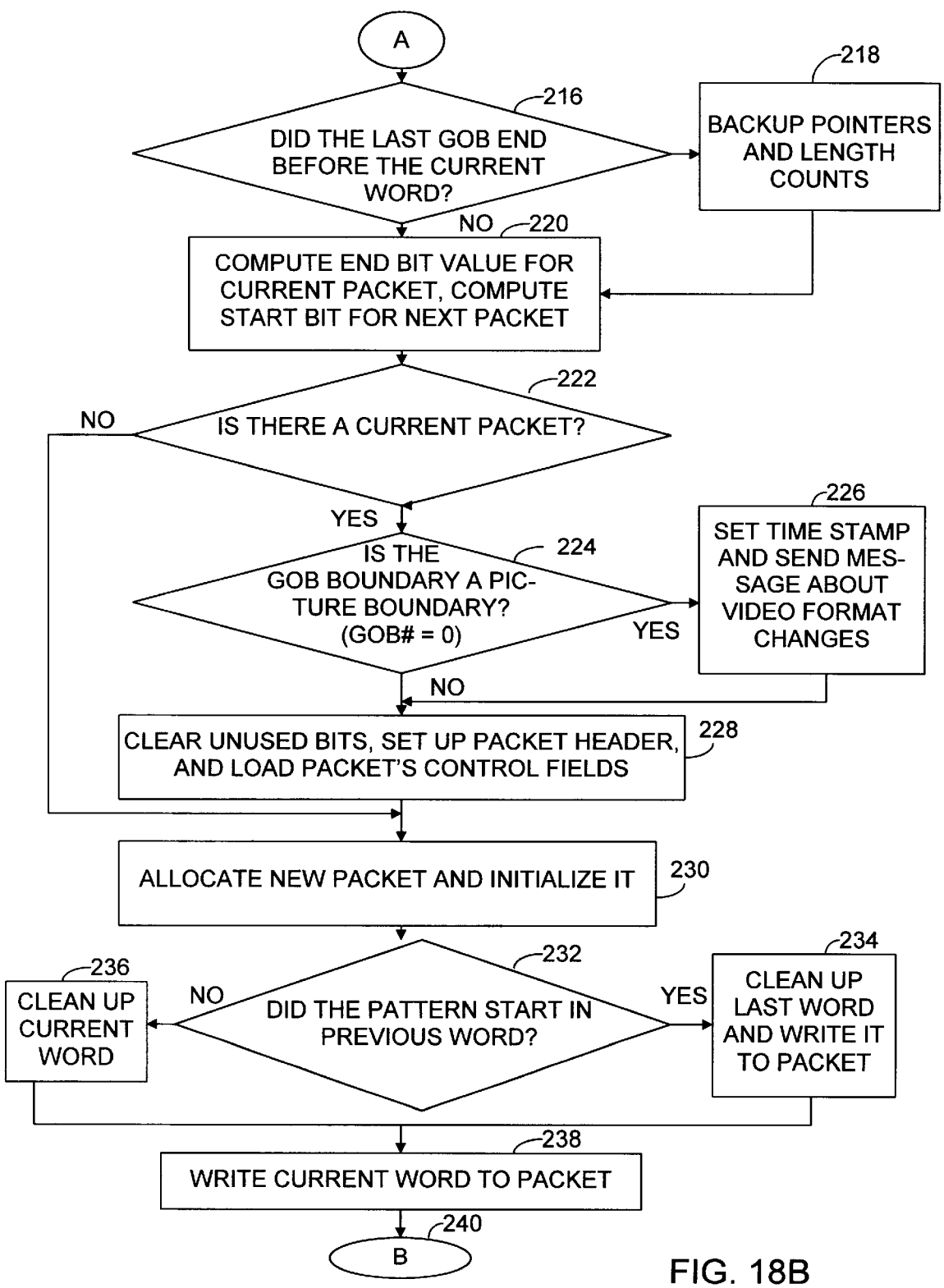

Once synchronization has thus been acquired, FIG. 13's process 88 proceeds with its steady-state operation of writing the video information to bit buffer 89 after verifying synchronization and ECC and removing those fields, the fill-indicator field, and any fill data, as was explained above. It is this buffer-89 information that a packetizing process 162 divides into packets that it places into a packet buffer 164 FIGS. 18A and 18B (together, "FIG. 18") illustrate the packetizing process 162. Block 166 represents entering the illustrated routine, which is called periodically during gateway operation. Occasionally, data corruption or lack of synchronization result in process 88's placing into buffer 89's control structure an indication that its data are not valid. When this happens, data written to the packet buffer 164 are probably corrupted, too, so the FIG. 18 routine resets the packet buffer 164 in a step that block 170 represents.

Figure 19:
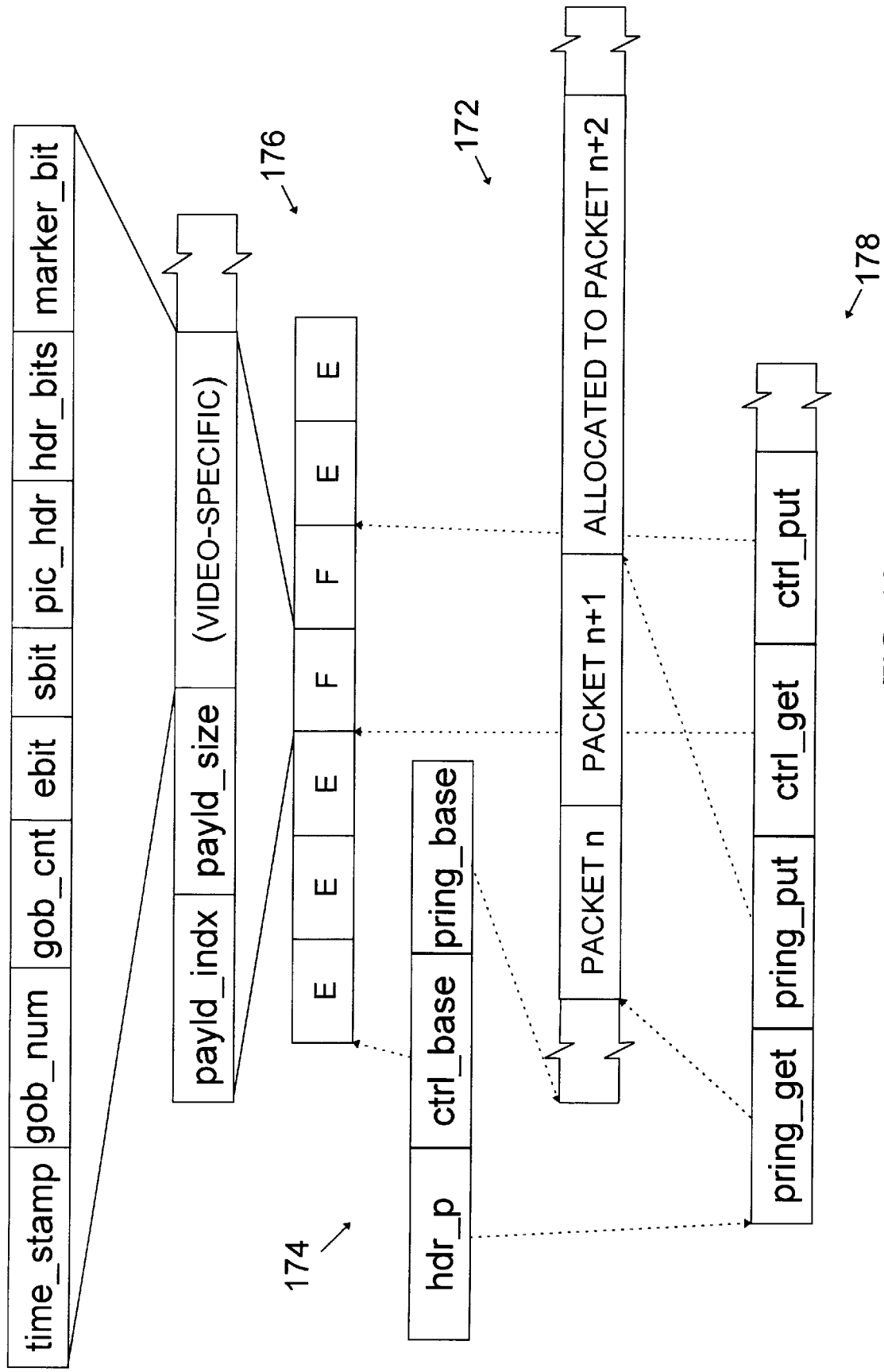
FIG. 19 illustrates the data structure of FIG. 13's packet buffer 164.

To understand the resetting operation, it is useful to consider the packet buffer's organization, which FIG. 19 illustrates. A fixed-size memory block 172 is allocated to storing variable-length packets. A process that is to add words to a packet being assembled in the packet buffer needs to determine where to place those words: it needs to determine where the packet being assembled starts. To that end, it fetches from a fixed location a pointer to the buffer's associated handle 174, which includes a pointer pring_base to the start of the packet-containing memory block 172. The handle also includes a pointer ctrl_base to the start of a control queue 176 containing fixed-length packet-control blocks, each of which can be associated with a respective one of block 172's packets and include payld_indx and payld_size fields that respectively tell where in memory block 172 the associated packet begins and how large it is.

An index ctrl_put in a packet-queue header 178 to which a handle field hdr_p points gives the starting location of the packet-control block that contains this information for the particular packet being assembled. (Here we use the term pointer when the field's contents are an actual memory address, and we use the term index when the field's contents are instead an offset from the address of the start of memory block 172 or control queue 176. The buffer typically occupies different parts of different accessing processors' memory spaces, and the use of indexes enables us to limit address translation to the handle 174.)

When the user process has finished a packet, it appropriately fills the payld_indx and payld_size fields of the packet-control block to which packet-queue header 178 points. It then specifies the location where the next packet will start. It does so by advancing the queue header 178's ctrl_put field to the start of the next control block, loading the next control block's payld_index field with a value that represents the block 172 location just beyond the last-entered word, and placing that same value in the queue header 178's pring_put field.

When a user process is to fetch a packet, it refers to the control block that the queue header 178's ctrl_get index identifies. Before it does so, though, it first makes certain that the header's ctrl_get index does not equal its ctrl_put index, i.e., that the next packet to be fetched is not still in the process of being formed. If it is, then the user process does not fetch a packet. Conversely, a user process will not start writing to a new packet if the queue is full or the difference between pring_get and pring_put is less than the desired packet size or if the free space indicated by that difference does not include a contiguous block of that size.

With this background, we return to the buffer-reset step 170 in FIG. 18's depiction of FIG. 13's packetizing process 162. In that step, the process resets to zero its internal indicator of where in the current packet to put the next word. It thereby effectively throws away that packet's previously stored data, which may include the corrupted information that caused the bit buffer to be reset. As blocks 180 and 182 indicate, the routine then determines whether FIG. 13's BCH-frame-checking process 88 has added data to bit buffer 89 since that buffer was last reset, and the routine ends if it has not.

Otherwise the routine continues in a loop, consisting of blocks 180, 184, 186, 188, and 190, in which it repeatedly removes bits from FIG. 13's bit buffer 89 and stores them in a buffer-164 packet until it encounters a GOB start code, which indicates that a new packet should start. However, the routine cannot begin storing the bits in packets before it finds a GOB boundary, so the block 186 step stores the fetched word only if it has previously started a packet in response to encountering a GOB boundary. When it encounters the GOB start code, the routine leaves that loop to perform a new-packet-initializing operation before returning to the loop.

Now, if the routine is in the middle of a fetched word when it detects the GOB start code, bits from that word will remain to be stored in the new packet when the routine returns to the loop, and the routine writes a word containing those bits into the new packet, as block 186 indicates. Otherwise, it first fetches a new word from the bit buffer, as block 188 indicates, and then normally stores that word in the packet being assembled.

The block-190 task of searching for a GOB start code can be quite time-consuming and would have a significant adverse impact on system performance if it were performed in a bit-by-bit fashion. We greatly speed system operation by instead employing tables of the numbers of leading or trailing zeroes in the various bit patterns that might be encountered in the words that we fetch from FIG. 13's bit buffer 89. Since the illustrated embodiment's word size is thirty-two bits, such an approach would ordinarily require tables that are too large to be practical. According to the present invention, though, the benefits of a look-up-table approach can be obtained without employing impracticably large tables.

Figure 20:
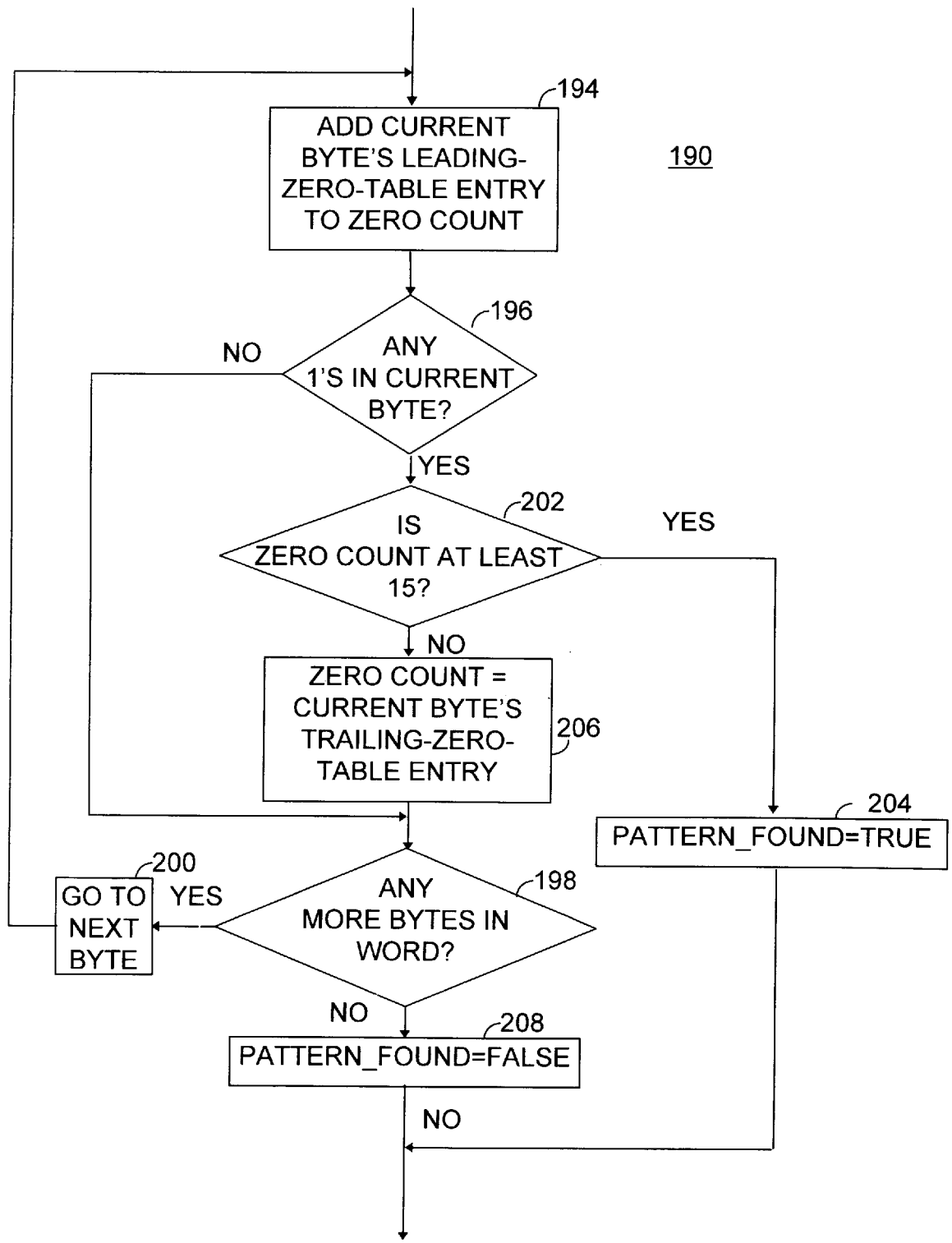
FIG. 20 is a flow chart of FIG. 18A's step 190.

Specifically, FIG. 20 illustrates our approach to performing FIG. 18's start-code-locating operation 190. By a simple shift/mask operation, the routine takes a byte from a fetched word and uses that byte to address a 256-entry table whose entries are the number of leading zeroes in their respective addresses. For instance, the byte 0001 1010, which has three leading zeroes, addresses a value of 3. The routine then adds the entry thus fetched to a count of the number of consecutive zeroes since the previous bytes' last one bit. Block 194 represents these steps.

Since the pattern to be found is fifteen zeroes (or sixteen zeroes for H.263) followed by a one, the current byte does not contain the end of the pattern if it includes no one bits, and the routine proceeds to the word's next byte, as blocks 196, 198, and 200 indicate. If the byte does include a one, then the routine sets a flag indicating that the pattern has been found if the zero count—i.e., the number of zero bits that preceded the one bit-is at least fifteen (or sixteen for H.263), as blocks 202 and 204 indicate. This completes FIG. 18's step 190.

But if the byte's one-containing bit is preceded by fewer than the requisite number of consecutive zeroes, then the pattern has not been found, and the count of consecutive zeroes must be restarted. To that end, the routine uses the current byte to address a second look-up table, this one's contents being the number of trailing zeroes in the address Is ing byte, and saves as the new zero count the value thus fetched, as block 206 indicates. It then continues the process with the next byte unless all the word's bits have been processed, in which case FIG. 18's step 190 is finished after the flag set is given a value indicating that the pattern has not been found, as block 208 indicates.

As block 190 indicates, the way in which the routine detects a GOB boundary involves searching for the GOB start code in the fetched bits-either the bits in the newly fetched word by themselves or those bits concatenated with bits in the previously fetched word. If the fetched bits do not contain the start code, the routine loops to fetch another word from the bit buffer, as block 212 indicates.

When the routine finally does locate the start code, it reads the GOB-number field (GN in FIG. 7). If that field's value is not zero, then the start code is not actually a picture start code; i.e., it is not part of a FIG. -5-format header. In that case, the routine copies the part of the GOB header that follows the GOB start code so that it can use it later in the routine. If the GOB number is indeed zero, it copies for future use the first sixty-four bits that follow the picture start code, thereby copying both the remainder of the picture header and the first GOB header. Block 214 represents these steps.

Since payld_size was incremented in step 186's writing of the fetched word into the packet being assembled, payld-size gives the size of the packet being assembled—i.e., of the packet whose last word contains the bit before the just-detected GOB start code—as including the word written in step 186. But if the detected GOB start code begins in that fetched word's very first bit position or in the previous word, then the packet should end with the previous word, so the routine decrements payld_size, as blocks 216 and 218 indicate. Block 218 also represents similarly backing up the process's packet word count and pointer to the location at which the packet ends.

Also, since a packet occupies an integral number of memory words but a given GOB's contents do not in general end on memory-word boundaries, the routine computes the bit positions where valid GOB data end in one packet's last word and begin in the next packet's first word. Block 220 represents this operation.

As was mentioned above, the routine is not actually assembling a packet when it encounters a GOB boundary for the first time. But on other occasions, when it is assembling a packet, the routine determines whether the detected GOB boundary is additionally a picture start code, as blocks 222 and 224 indicate. If it is, the next packet contains data for a new picture and should get a new time stamp. Block 226 represents consulting the local clock for a new time stamp to be placed in the next packet's control block.

Additionally, a routine that performs higher-protocol-level operations on the FIG. 18 routine's output will need other information from the picture header, and block 226 further represents sending that routine a message containing the further information.

If the GOB boundary is not additionally a picture boundary, on the other hand, the next packet's data belong to the same picture as the previous packet's, so the next packet will receive the same time stamp as the previous one.

Regardless of whether the GOB boundary is also a picture boundary, encountering the GOB boundary indicates that none of the bit-buffer bits after that boundary go into the packet currently being built. So all bits after that boundary in the last packet word should be set to zero. Block 228 represents this step as well as completion of the associated control block in FIG. 19. This includes filling the control block's time_stamp field. If the GOB boundary was a picture boundary the time stamp is the one obtained in step 226. Otherwise it is the same as the previous packet's time stamp. In some embodiments, there may be a later operation in which single-GOB packets are combined into a multiple-GOB packet, so FIG. 19 depicts the control block as including a gob_cnt field to indicate how many GOBs the packet contains, and the operation of FIG. 18's block 228 initializes this value to one. It also fills the ebit field with the end-bit value determined in step 220. Finally, if step 124 encountered a picture start code, it sets to one the marker_bit field to indicate that the packet is the end of a picture. Otherwise, it gives that field a zero value.

The part of the fetched information that begins with the GOB start code needs to be put into a new packet, so the routine determines where in FIG. 19's memory block 172 the new packet should be put. As was mentioned before, memory block 172 is a fixed block of memory, and packet writing wraps around to the start of reat block after it reaches the block's end. But it is convenient for the wrapping to occur only between packets, not within a packet. So the routine determines whether memory block 172 includes enough room for a maximum-sized packet beyond the end of the just-completed packet. If so, the next packet starts in the word that follows the just-finished packet's last word. Otherwise, it starts at the beginning of memory block 172. Block 228's operations include making this determination as well as performing necessary initialization tasks such as incrementing the ctrl_put field in FIG. 19's header 178 to the next control block in queue 176, and updating the header 178's pring_put field.

Block 230 represents updating the new control block's payld_indx field to indicate the new packet's start location, setting its payld_size value to zero, setting its gob_num value to the GOB number read in FIG. 18's step 212, and setting its sbit value to specify the bit position where the detected start code begins in the new packet's first word. The initialization further includes filling its gob_num field with the GOB-number value copied in step 214, and, if the last-encountered start code was a picture start code as indicated by a GOB number of zero, filling its pic-hdr and hdr_bits fields with the sixtyfour bits copied as a result in step 214. If the detected GOB start code was not a picture start code, on the other hand, the pic_hdr field receives the same value as the pic_hdr field in the previous packet's control block, while the hdr_bits field receives the copied remainder of the GOB header.

Then the routine writes the fetched data into FIG. 19's memory block 172. Specifically, if the GOB start code began in the previous word, the routine copies that word, sets all of the copy's bits before the start code to zeros, writes the result into the new packet, and updates the new packet's payld_size to reflect the new contents. If the GOB start code began in the current word, the routine similarly cleans up the current word. In both cases, the routine then writes the current word to the packet and updates payld_size. Blocks 232, 234, 236, 238, and 240 represent performing these steps and returning to the word-fetching loop.

Although we have described starting a new packet with each GOB, GOB sizes are variable, and some overhead savings can be realized if packet sizes can approach the maximum-transmission-unit size of the underlying (UDP) protocol. For this reason, the contents of FIG. 13's packet buffer 164 may be written to a further, similarly organized packet buffer in which a packet begins with the contents of a packet from buffer 164 but has further buffer-164 packets'contents added to it until addition of the next buffer-164 packet's contents would result in a packet size that exceeds the maximum-transmission-unit size. It is best to do this only to the extent that no picture bridges a packet boundary, so the control block for a resultant packet can retain the same time stamp as all of its constituent packets. In constructing the multiple-GOB packet itself, the last word containing one constituent packet is ordinarily ORed with the next constituent packet's first word to make a single composite-packet word. The gob_cnt would contain a number representing how may GOBs the composite packet contains, and the other control-block fields would be filled appropriately. For instance, its sbit field would receive its first constituent packet's sbit value, and its ebit field would receive its last constituent packet's ebit value.

Figure 21:
FIG. 21 is a diagram of FIG. 3's H.261 header.

With each outgoing packet's information thus determined, a packet-assembly/dissassembly process 242 assembles that information into a packet whose format may be that of FIG. 3. FIG. 21 is a diagram of FIG. 3's H.261-header field. The SBIT and EBIT fields receive the contents of the packet buffer's sbit and ebit fields. A one value for the I field indicates that it the packet contains only INTRA-frame encoded blocks, whereas a zero value indicates no such restriction. This field can be either set to zero uniformly or filled with a corresponding bit in the pic_hdr field. A zero value in the V field indicates that the stream may use motion vectors, whereas a one value indicates that it does not. We set this field to one uniformly. A zero in the GOBN field indicates that the packet begins with a GOB header. Since we start all packets with a GOB header, this field is always zero. RFC 2032 similarly specifies that zeroes be placed in the remaining fields if the packet starts with a GOB header, so these fields all contain zeroes, too.

As mentioned above, FIG. 4 depicts the format of the FIG. 3 packet's RTP header. To construct that header, we place in the V field the number of the RTP-format version (in our current implementation, version 2) being employed. We send no padding contents, so the P field is always zero, as is the X field, to indicate that there is no extension to the basic header that FIG. 4 depicts. Although the illustrated gateway is embodied in circuitry for a multipoint control unit, the illustrated embodiment's gateway function does not implement source mixing, so the RTP header's CC field, which indicates how many contributing-source-identifier fields the header includes, always has a value of zero, and the contributing-source-identifier fields that FIG. 4 includes are therefore omitted.

The outgoing packet's RTP-header M field (marker field) of FIG. 4 receives the marker_bit field in the block of FIG. 19's control queue 176 corresponding to the last GOB that the packet includes. Its PT (payload-type) field is set in accordance with RFC 1890 to a value of 31 for H.261 encoding and 34 for H.263 encoding. This value is the same throughout a session. It is the product of higher-level negotiation, mediated by the gateway, between nodes at the other ends of the circuit-switched and packet-switched channels.

When a video-bitstream transmission starts, a sixteen-bit random number is chosen as the contents of FIG. 4's sequence-number field in the first outgoing packet. The sequence number is ordinarily incremented by one for each subsequent packet. But if, say, bandwidth limitations necessitate omitting some of the incoming video bitstream, the sequence number is incremented by two to apprise the receiving node of the information loss.

The timestamp field, of course, receives the corresponding control block's time_stamp value.

The operation that translates packets received from the packet-switched channel is essentially the reverse of the just-described operation used to assemble them for transmission. FIG. 13's packet-assembly/disassembly process 242 stores each received packet's payload in a further packet buffer 244, filling fields of its FIG. 19 data structure from the received packet's RTP and H.261 headers. By using the resultant ebit and sbit fields, a packet-to-video process 246 extracts the valid video bits and places them into a bit buffer 248. Process 250 divides the resultant bit sequence into 492-bit segments from which it forms and places into a bit buffer 252 frames of the type that FIG. 2's third row depicts. That is, process 250 prepends the appropriate fill bit to the 492-bit segment, computes and appends the ECC-code field to the result to form a code word, and prepends a synchronization bit to the resultant code word. The synchronization bits occur in the predetermined sequence, and the fill bits are generated in a manner that will be described presently.

A multiplexing process 254 combines the resultant video stream with audio and data streams to form H.221 blocks in accordance with masks and related information that process 74 has obtained as mentioned above from received command and capacity codes and placed in a table 256. In forming transmission frames from these blocks, a framer process 258 must receive blocks from the multiplexor 254 at a predetermined rate that may exceed the rate at which the packet-switched channel delivers the information that the transmission frames are to contain. So when the multiplexing process 254 finds that bit buffer 252 is running low, it notifies the framer process 250 and thereby triggers its generation of one or more fill blocks. To indicate that the block is merely fill, process 250 sets the F bit in FIG. 2's third row.

It is apparent from the foregoing description that the present invention enables a gateway to avoid much of the computational cost that achieving code synchronization would otherwise exact. It therefore constitutes a significant advance in the art.

What is claimed is:

1. For achieving synchronization with a bitstream that includes synchronization bits spaced by a synchronization interval and forming a predetermined synchronization sequence, a method comprising:

A) receiving an electrical signal representing the bitstream;

B) performing a group of update operations, wherein each update operation comprises:
  i) beginning with a sum word consisting of all zeros;
  ii) computing and generating electrical signals representing a comparison word by bitwise comparing a synchronization word with a bit-stream word, the synchronization word being associated with a bit of the synchronization sequence and consisting of a word-width replication of that bit, each bit-stream word consisting of a sequence of sequential bit-stream bits offset in the bitstream by integral numbers of synchronization intervals from the bit-stream words used in the other update operations in the group, the bits associated with synchronization words used in update operations that use bit-stream sequences offset from each other by a given number of synchronization intervals being offset by that given number from each other in the synchronization sequence; and
  iii) replacing the sum word with the result of bitwise ORing the sum word with the comparison word;

C) if all of the sum word's bits have become ones within a predetermined number of the group's update operations, performing a further such group of update operations with different bit-stream words; and D) if not, thereupon generating an electrical indication that the bit-stream bits processed to produce the zero-valued bit are synchronization bits.

2. A method as defined in claim 1 wherein:

A) the bitstream's contents at predetermined code offsets from each synchronization bit consist of a code word of a predetermined error-detection code when the bitstream is properly received; and B) the method further includes:
  i) making a determination of whether the bit-stream bits at the code-word offsets from each bit identified as a synchronization bit form a code word of the predetermined error-correction code; and
  ii) generating an electrical indication of the result of that determination.

3. A method as defined in claim 1 further including responding to the synchronization indication by thereafter:

A. making determinations of whether subsequently received bits identified as synchronization bits follow the predetermined synchronization sequence; and B. generating electrical indications of the results of those determinations.

* * * * *